United States Patent [19]

Yamakido et al.

[11] Patent Number: 4,507,792
[45] Date of Patent: Mar. 26, 1985

[54] PCM ENCODER CONFORMABLE TO THE A-LAW

[75] Inventors: Kazuo Yamakido, Nishitama; Shiro Hagiwara, Tachikawa; Fumiaki Fujii, Nishitama, all of Japan

[73] Assignee: Hitachi, Ltd., Tokyo, Japan

[21] Appl. No.: 476,620

[22] Filed: Mar. 18, 1983

[30] Foreign Application Priority Data

Mar. 26, 1982 [JP] Japan ................... 57-47203

[51] Int. Cl.³ ............... H04B 12/04; H03K 13/02
[52] U.S. Cl. ................... 375/30; 332/11 D; 340/347 AD
[58] Field of Search ............... 340/347 AD, 347 CC, 340/347 SH; 375/25, 26, 27, 28, 30, 34; 332/9 R, 11 R, 11 D; 364/574; 381/31, 32, 94

[56] References Cited

U.S. PATENT DOCUMENTS

| | | | |
|---|---|---|---|
| 3,688,221 | 8/1972 | Fruhalf | 340/347 SH |
| 3,882,489 | 5/1975 | Guggolz | 340/347 SH |
| 4,151,516 | 4/1979 | O'Neill | 340/347 AD |

Primary Examiner—Benedict V. Safourek
Attorney, Agent, or Firm—Antonelli, Terry & Wands

[57] ABSTRACT

In a PCM encoder, in order to reduce noise in an idle channel or in the absence of any voice signal, a detector circuit is provided which detects the idle channel, and a circuit is connected to the detector circuit which fixes the polarity bit of the PCM signal produced by the PCM encoder when the detector circuit has detected the idle channel.

8 Claims, 7 Drawing Figures

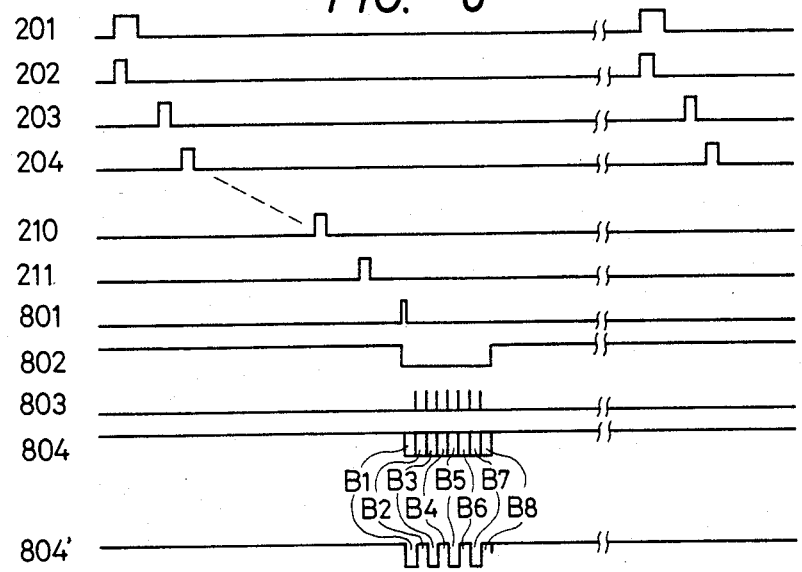

PCM ENCODER CONFORMABLE TO THE A-LAW

FIELD OF THE INVENTION

The present invention relates to a PCM encoder.

More particularly, it relates to a device for reducing noise generated in an idle channel or when there is no voice signal; namely, idle channel noise, in a so-called PCM encoder which is an apparatus for converting analog signals such as telephone speech into PCM digital signals.

BACKGROUND OF THE INVENTION

In the case of converting voice signals into PCM signals for use in communication, there are two types of encoding and decoding laws (A-law, $\mu$-law) recommended by the International Telegraph and Telephone Consultative Committee (CCITT).

The A-law uses a conversion characteristic for encoding as shown in FIG. 1 and a conversion characteristic for decoding as shown in FIG. 2. Accordingly, the total conversion characteristic for encoding and decoding becomes as shown in FIG. 3. That is, it has smaller quantizing steps for smaller absolute values of signal amplitudes and larger quantizing steps for larger absolute values. Here, $VF_X$ is a maximum encoding amplitude, and $VF_R$ is a maximum decoding amplitude of FIG. 3 in which analog inputs $X_n$ are close to 0 (zero). However, digital codes shown in the above diagrams are intended to simplify the explanation and are not A-law output character signals (PCM OUTPUT in FIG. 7) as will be described later. As apparent from FIG. 4, encoder input levels $X_n$ and decoder output levels $Y_n$ have the relationship of $$Y_n = \frac{X_{n-1} + X_n}{2} \quad (n = 1, 2, 3, \ldots \text{ and } 128)$$

At the point of input level $X_0=0$, accordingly, the output level changes stepwise. That is, whenever the input signal has a level between $X_1$ and $-X_1$, the output signal becomes a signal level of either $Y_1$ or $-Y_1$.

Such conversion characteristic intends to minimize the quantization noise of signals obtained by encoding analog signals with continuous level values and decoding the encoded signals. On the other hand, in a case where only noise enters an encoder in the idle channel state or in the absence of any voice signal, and no matter how much the amplitude of the noise is suppressed, a noise signal having an amplitude level equal to one-half of the quantizing step level of the encoder, namely, an amplitude level of $\pm Y_1$, is involved in the output of a decoder. This phenomenon can be termed the "amplification possessed by the conversion characteristic for encoding and decoding".

On account of the amplfication possessed by the conversion characteristic for encoding and decoding; accordingly, it has been impossible to suppress the idle channel noise characteristic to below a certain value. This is stated in detail by R. H. Shennum et al, "Performance Limitations of a Practical PCM Terminal", *The Bell System Technical Journal,* January 1962, pp. 156–158.

SUMMARY OF THE INVENTION

It is therefore an object of the present invention to provide, in an encoder for PCM communication having the conversion characteristic for encoding and decoding as described above, a device which, in effect, sharply reduces the idle channel noise without exerting any influence on the various characteristics of the encoder during talking, for example, the signal to total-distortion power ratio characteristic, the gain tracking characteristic, or the attenuation frequency dependency. The device converts the noise in a signal band into a low frequency component outside the signal band, so as to prevent the noise from affecting a necessary signal.

In order to accomplish this object, according to the present invention, the encoder having the foregoing conversion characteristic for encoding is furnished with the function of detecting the idle channel state, so as to fix the polarity bit of an encoder output PCM signal in the idle channel state or in the absence of any voice signal.

The above-mentioned and other objects and features of this invention will become more apparent by reference to the following description taken in conjunction with the accompanying drawings.

BRIEF DESCRIPTION OF THE DRAWINGS

FIG. 6 is a time chart for explaining the operation of the embodiment; and

FIG. 7 is a diagram showing character schemes for explaining the operation of the embodiment.

DETAILED DESCRIPTION OF THE PREFERRED EMBODIMENTS

Figure 5:
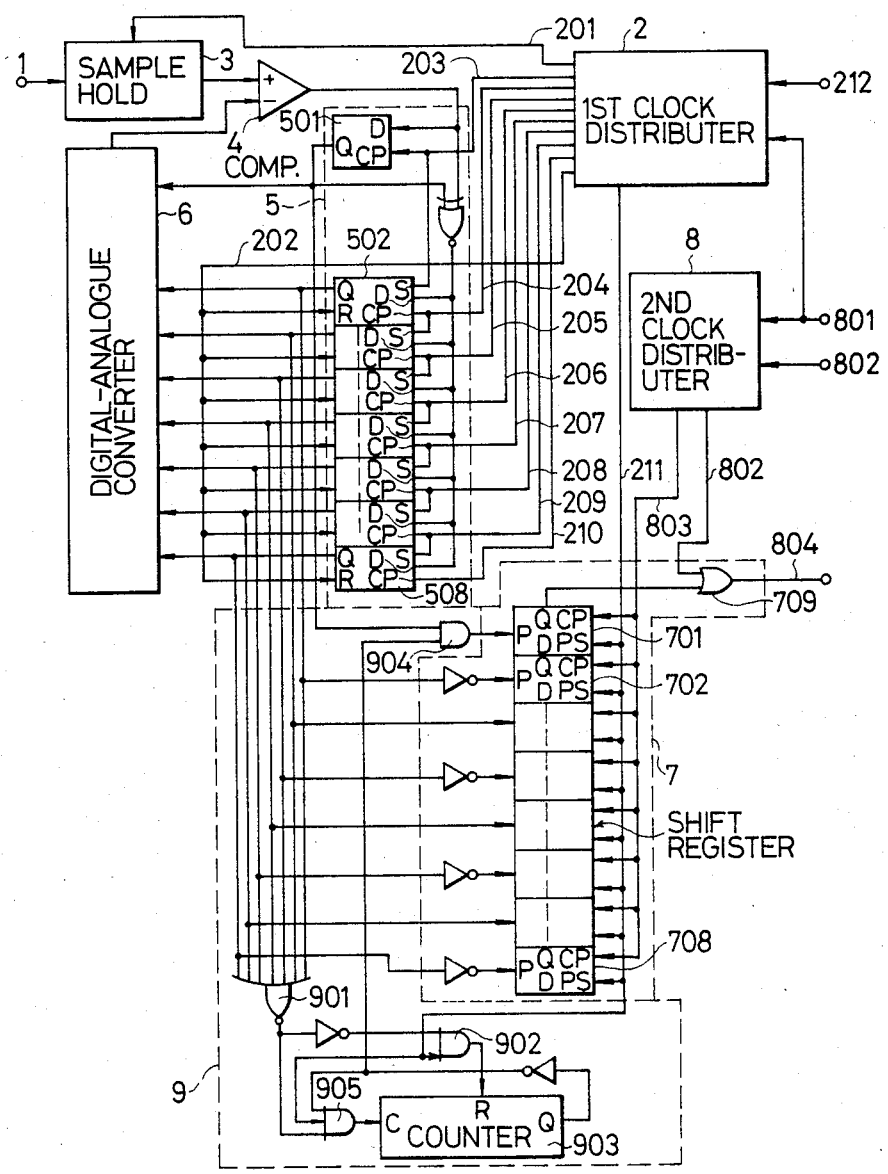
FIG. 5 is a circuit diagram showing the arrangement of an embodiment of a PCM encoder according to the present invention.

FIG. 5 is a circuit diagram of an embodiment of a PCM encoder according to the present invention, while FIGS. 6 and 7 are a time chart and a character scheme diagram for explaining the arrangement and operation of the embodiment, respectively.

This embodiment is an encoder based on the A-law, in which parts other than an idle channel state detector 9 are the same as those of a hitherto-known PCM encoder.

An input analog signal applied to an input terminal 1 is fed into a sample-and-hold circuit 3 by a clock 201 (8 kHz) which is supplied from a first clock distributor 2. A voltage ($V_{IN}$) held in the sample-and-hold circuit is applied to one input terminal of a voltage comparator 4. At the same time that the input signal is sampled, the clock distributor 2 provides a pulse 202 for resetting flip-flop circuits 502–508 within a successive approximation register 5.

Figure 1:
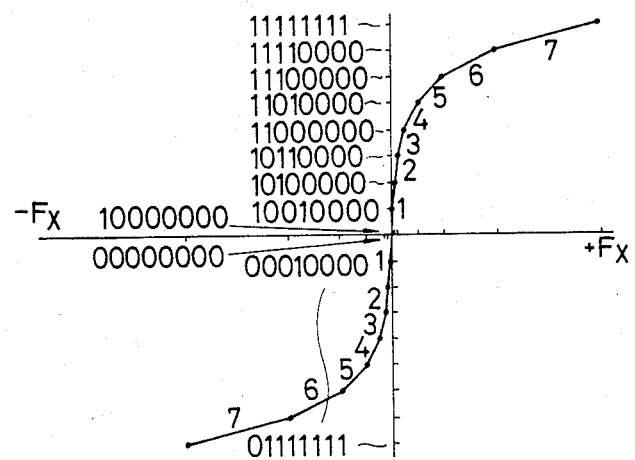
FIG. 1 shows a conversion characteristic for A-law encoding.
Figure 2:
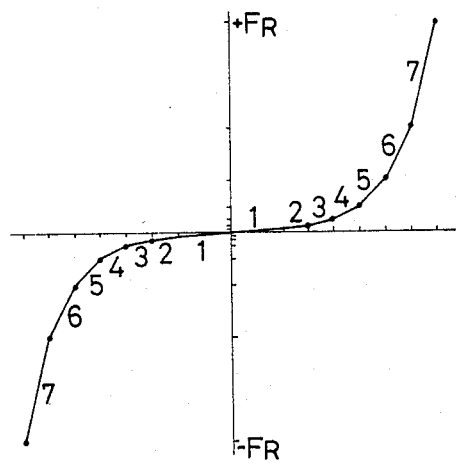
FIG. 2 shows a conversion characteristic for A-law decoding.
Figure 3:
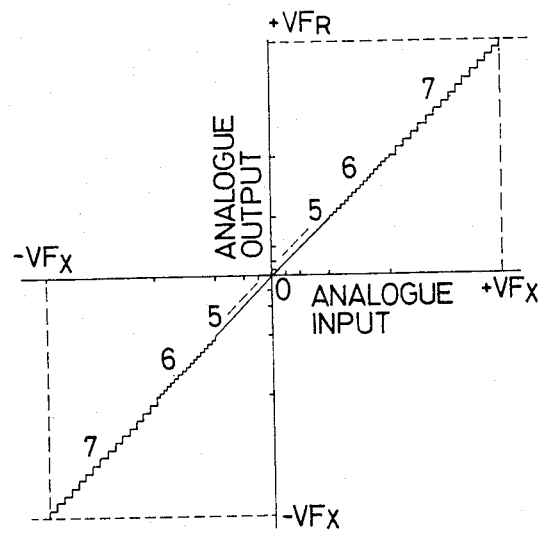
FIG. 3 shows a total conversion characteristic for encoding and decoding based on the A-law.

A nonlinear digital-to-analog (D/A) converter 6, which has the conversion characteristic in FIG. 1 stated before, converts a code signal in the successive approximation register 5 into an analog signal and applies the latter to the other input terminal of the comparator 4 as a reference voltage. When the pulse signal 202 has been generated, the output of the register 5 becomes a code expressive of the null voltage, so that the output of the converter 6 becomes 0 (zero) volt. Accordingly, the voltage comparator 4 is supplied with a signal by which the polarity information of the sampled and held analog input signal $V_{IN}$ can be determined (for example, "1" for a positive input signal and "0" for a negative input signal).

The polarity information signal is latched in a first flip-flop 501 within the successive approximation register 5 by a clock 203 which is supplied at the next point of time. Herein, the clock 203 is connected so as to simultaneously set the second flip-flop 502. As a result, the output of the D/A converter 6 produces the lowermost analog voltage level of a fourth segment which corresponds to a digital code "11000000", shown in the encoding conversion characteristic of FIG. 1, for the positive input $V_{IN}$ or a digital code "01000000" for the negative input $V_{IN}$. In consequence, the output of the voltage comparator 4 provides the result of decision as to whether or not the amplitude of the held analog voltage $V_{IN}$ is a voltage above or below the level of the fourth segment. This output digital signal of the comparator 4 has the logic of exclusive NOR taken with the foregoing polarity information (the output of the flip-flop 501). The result is applied to the data input terminals of the second and succeeding flip-flops 502-508, and is latched in the second flip-flop 502 by the next clock 204.

The output digital code of the comparator 4 is a natural binary code as shown in the column COMP OUTPUT in FIG. 7. On the other hand, in constructing D/A converters, there is generally employed, principally for the simplification of the circuit arrangement, a construction wherein a voltage level corresponding to amplitude bits ($B_2$-$B_8$) and fixed to either polarity of positive or negative (that is, the absolute value of an amplitude) is generated and is thereafter non-inverted or inverted in accordance with a polarity bit. Therefore, the present embodiment employs the same construction. That is, the output of the comparator 4 and the polarity bit (the output of the flip-flop 501) are applied to the data input terminals D of the flip-flop circuits 502-508 through an EXCLUSIVE NOR circuit, while the clock signals CP of the immediately-preceding flip-flop circuits are simultaneously applied to the set terminals S thereof. Accordingly, the input and output codes of the aforementioned successive approximation register 5 become so-called folded binary codes in which the side $V_{IN}<0$ is symmetric to the case of $V_{IN}>0$ taken as a reference, as indicated in the column SAR OUTPUT in FIG. 7.

After the polarity bit of the input has been determined by the pulse 203, seven pulses 204-210 are impressed at predetermined intervals. Thus, the digital code composed of 8 bits, which represents a step level in one segment corresponding to each level of the held analog voltage $V_{IN}$, is found by a successive comparison type A/D converter which is constructed of the comparator 4, the successive approximation register 5 including the EXCLUSIVE NOR circuit, and the D/A converter 6.

Now, a digital code which is actually provided from the A-law encoder, that is, a PCM output code as shown in the column PCM OUTPUT in FIG. 7 is obtained by inverting even bits in the code of the SAR 5 (recommendation by CCITT, Rec. G. 711). In the embodiment of FIG. 5, this is realized by the use of a PCM output register 7.

In more detail, the PCM output register 7 is constructed of a parallel-in serial-out shift register that consists of flip-flops 701, ..., 708 which are disposed in correspondence with the respective flip-flops 501, ..., 508 of the register 5, and a logic gate 709 which controls the serial data output of the output register 7. The parallel input terminals P of the flip-flops 701-708 are supplied with the outputs of the corresponding flip-flops 501-508 under the condition that the code "1" or "0" of the output of each even-numbered flip-flop is inverted. The pre-set terminals PS of all the flip-flops 701 708 are connected in common to line 211 of the first clock distributor 2, and the aforementioned converted code from the register 5 is latched in the flip-flops 701-708 by a pulse signal 211 which is sent from the clock distributor 2.

A PCM output is usually connected in a wired-OR arrangement directly with the PCM output of another encoder for the purpose of time-division multiplexing. Therefore, the PCM output needs to be held at a high logic level during the time interval during which the PCM signal is not provided as an output. To this end, the logic gate 709 is used, and the arrangement is such that when a synchronizing clock 801 for setting the PCM output time is applied, a second clock distributor 8 generates a pulse 802 with a width corresponding to eight clock cycles of a PCM outputting clock externally supplied to a terminal 805, and a clock 803 for outputting the PCM signal 804 within the time interval.

Figure 4:
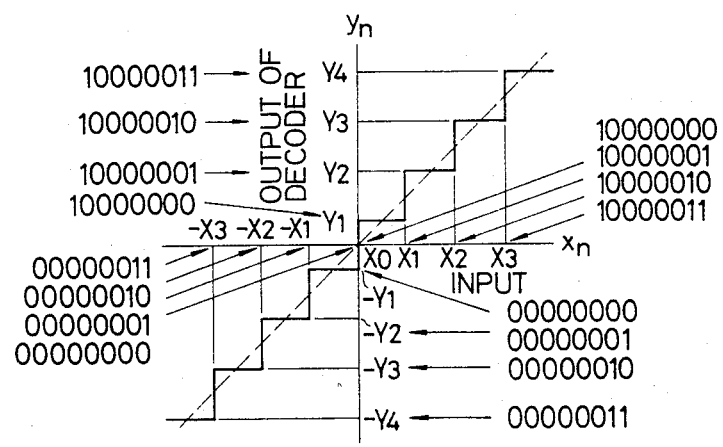
FIG. 4 is an enlarged diagram of a part of the characteristic shown in FIG. 3.

In the above, the arrangement and operation of an A-law encoder have been described. As illustrated in FIGS. 4 and 7, the PCM code which is delivered in the idle channel state or in the absence of any voice signal is "10000000" or "00000000" at the input or output point of the SAR 5. That is, the PCM codes differ in only the polarity bit. Now, there will be explained the circuit for detecting the idle channel state and means for fixing the polarity bit in the state, which form the subject matter of the present invention.

A NOR gate 901 provides a high logic level "1" only when all the outputs of the second to eighth flip-flops 502-508 of the SAR 5 are of the low logic level "0". Now, when at least one of the flip-flops 502-508 is "1", a first AND gate 902 supplies the latch pulse 211 of the PCM output register 7 to the reset terminal R of the counter 903. Therefore, this counter 903 is reset, and its output Q becomes "0". Accordingly, a second AND gate 904 remains enabled and does not impede the setting of the polarity bit of the SAR 5 in accordance with the state of flip-flop 501.

Next, when all the flip-flops 502-508 are in the logic state "0", that is, when the amplitude of the input signal is smaller than the minimum step, the reset state of the counter 903 is released, while the latch pulse 211 is supplied as a clock for the counter 903 through a third AND gate 905. When this status is maintained over a predetermined number of sampling cycles of the encoding, the output Q of the counter soon changes to the high logic level "1", so that the ensuing input of the latch pulse 211 to the counter 903 is inhibited by the blocking of gate 905 from the inverted output of counter 903. At the same time, the output of the second AND gate 904 is fixed to "0" irrespective of the output logic of the first flip-flop 501 of the SAR 5. The PCM output 804 is accordingly fixed to the code "01010101" of the polarity bit "0" as indicated at 804' in FIG. 6.

However, when at least one of the flip-flops 502-508 of the SAR 5 becomes non-zero again (that is, when the input signal level becomes greater than the minimum step level $\pm Y_1$) before or after the output Q of the counter 903 becomes the high logic level "1", the counter 903 is immediately reset. Therefore, the previous status is restored, and the encoded result is provided as it is until the zero level state of the input operates to change the output of the counter 903 to "1" again.

In this case, how many bits the counter 903 is to have before providing its output becomes a problem. More specifically, even when all the outputs of the second to eighth flip-flops of the SAR appearing within a certain prescribed time are of the level "0", this might correspond to an analog signal applied to the encoder normally and having an amplitude within one quantizing level ($0-X_1$), as seen from FIG. 4. In that case, the fixation of the polarity bit should be avoided.

Since, however, the frequency band of voice signals is 300 Hz–3.4 kHz as stipulated also in the CCITT recommendation referred to above, frequency components below 300 Hz should originally be excluded. Accordingly, the object of the present invention can be attained without affecting various characteristics in the talking state when the idle channel state is determined on the basis of a period of time longer than 1/300 second, in other words, when any excluded signal is below 300 Hz. Thus, the counter 903 is formed as a clock counter having 8000/300≃27 bits or more because the period in the case of encoding with the successive comparison system is ⅛ ms.

Although the above embodiment has been described as to the case of fixing the polarity bit to "0", it is a matter of course that a quite similar effect is attained when the polarity bit is fixed to "1" conversely or when an encoded state level immediately before the fixation is used. Further, the detection of the "0" level state of amplitude can be readily realized even with an arrangement which uses a signal derived after converting the output code of the PCM output register. Moreover, the technique of the present invention is readily applicable to, not only the A-law encoder, but also μ-law and other encoders for communications.

As described above in detail, according to the present invention, a very small number of logic gates are added to the conventional circuit arrangement, whereby the effect of improving idle channel noise by 10 dB or more in comparison with the prior art case of directly delivering an encoded result as a PCM output signal is achieved.

What is claimed is:

1. A PCM signal encoder for converting an input analog signal into a PCM code signal composed of a polarity bit and a plurality of bits expressive of an amplitude, comprising:
   a sample-and-hold circuit which samples and holds an input analog signal;
   a digital-to-analog converter;
   voltage comparator means for comparing the output of said sample-and-hold circuit and the output of said digital-to-analog converter;
   successive approximation register means connected to receive the output of said comparator means for supplying a succession of digital output values to said digital-to-analog converter;
   output register means for converting the output code of said successive approximation register means and for supplying the converted code to an output of said encoder as a PCM code signal at a predetermined time;
   detection means responsive to said amplitude bits of said PCM code signal for detecting an idle channel state representing a no input signal condition; and
   means connected to said detection means for fixing the polarity bit of the PCM code signals in said output register means when the output of said detection means indicates an idle channel state.

2. A PCM signal encoder as defined in claim 1, wherein said detection means includes means for detecting the output of said successive approximation register means indicating a zero amplitude of said sampled analog signal, and counter means connected to said first means for counting during the period of time in which successive samples of said analog signal remain at a zero amplitude, so as to detect an idle channel state upon reaching a predetermined count.

3. A PCM signal encoder as defined in claim 2, wherein said polarity bit fixing means includes means responsive to said counter means having counted to said predetermined count for setting the inputs of the polarity bits of said output register means to a predetermined identical polarity.

4. A PCM signal encoder as defined in claim 1, wherein said successive approximation register means includes a first flip-flop which receives the output of said comparator means and which delivers an output in response to a first clock pulse; and second to eighth flip-flops which are set by clock pulses of the flip-flops at respectively preceding states, and which have input terminals supplied in common with an EXCLUSIVE NOR result between the output of said first flip-flop and the output of said comparator means and clock input terminals supplied with clock pulses at predetermined intervals, respectively.

5. A PCM signal encoder as defined in claim 4, wherein said detection means includes first means for detecting all zero outputs of said second to eighth flip-flops, and counter means for counting the outputs of said first means for successive samples of said analog signal, so as to detect an idle channel state upon reaching a predetermined count, said counter means being connected to be reset by said first means in the absence of detection of all zero outputs from said second to eighth flip-flops.

6. A PCM signal encoder as defined in claim 5, wherein said polarity bit fixing means is an AND gate circuit connected to said counter means so that, when said counter means has counted to said predetermined count, the output of said first flip-flop of said successive approximation register means is hindered from entering an input terminal of said output register means for the polarity bit.

7. A PCM signal encoder as defined in claim 1, wherein said detector means comprises means for detecting the idle channel state when said analog input signal has had zero amplitude over, at least, 27 sampling periods.

8. A PCM signal encoder as defined in claim 1, wherein the output code of said successive approximation register is converted in accordance with the A-law.

* * * * *